United States Patent [19]

Burke, Jr., deceased et al.

[11] 4,107,132

[45] Aug. 15, 1978

[54] VINYLIC FILLER PRODUCTS AND PROCESSES FOR PRODUCING SAME

[75] Inventors: Oliver W. Burke, Jr., deceased, late of Fort Lauderdale, Fla., by Norma Scala, administratrix; Victor T. Humphreys, Pompano Beach, Fla.

[73] Assignees: Marion Darrah; Joseph Y. Houghton, Pompano Beach, Fla. ; Co-Trustees

[21] Appl. No.: 712,213

[22] Filed: Aug. 6, 1976

[51] Int. Cl.$^2$ .......................... C08F 6/00; C08F 6/14; C08F 6/24
[52] U.S. Cl. ................ 260/42.14; 260/874; 260/880 R; 260/885; 528/246; 528/495; 528/497; 528/498
[58] Field of Search ...................... 528/495, 497, 498; 260/73 R, 42.14, 880 R, 885, 874

[56] References Cited

U.S. PATENT DOCUMENTS

| | | | |
|---|---|---|---|
| 2,458,636 | 1/1949 | Plambeck | 260/29.6 |
| 2,673,193 | 3/1954 | Kolvoort | 260/92.8 |
| 3,190,850 | 6/1965 | Burke | 260/38 |
| 3,423,358 | 1/1969 | Burke | 260/41 |
| 3,828,012 | 8/1974 | Arndt et al. | 260/80.73 |
| 3,970,725 | 7/1976 | Tugukuni | 260/901 |

*Primary Examiner*—Stanford M. Levin
*Attorney, Agent, or Firm*—Hall & Houghton

[57] ABSTRACT

Improved dry soft powdering vinylic filler products and processes for producing the same are disclosed. The vinylic filler material consists essentially of spheruloidal organic polymer material three dimensionally cross-linked to essential insolubility in any physical solvent and having primary particles in the colloidal size range of about 5 millimicrons to not more than 4.0 microns average diameter; said spheruloidal particles having on the surfaces thereof from 0 to an equal weight based on the spheruloids, of an insoluble coloring component, said coloring component, when present, comprising organic and/or inorganic material at least in part precipitated in insoluble form onto said surfaces from water soluble precursor material thereof in aqueous solution.

The improved product is formed by treating the aqueously wet never previously dried vinylic filler material with low boiling hydrocarbon solvent material preferably applied in conjunction with an oil soluble surface active agent, which treatment prevents the vinylic filler material from forming hard agglomerates on drying.

8 Claims, No Drawings

VINYLIC FILLER PRODUCTS AND PROCESSES FOR PRODUCING SAME

BACKGROUND OF THE INVENTION

1. Field of the Invention

This invention relates to physical solvent insoluble vinylic filler products, i.e. vinylic fillers and vinylic filler pigments, and aims generally to improve the same.

2. Description of the Prior Art

Organic fillers known as vinylic fillers and suitable for reinforcing elastomers and plastomers and for other purposes are described in the publication "Reinforcement of Elastomers" edited by Gerald Kraus, Interscience Publishers, New York, 1968, at pages 511–527. Such fillers were employed in aqueous dispersion for blending with latices to form elastomer masterbatches.

It has also been shown in U.S. Pat. Nos. 3,190,850 and 3,423,358 that vinylic filler pigments can be made by combining with vinylic fillers, water soluble dyestuffs and dyestuff components and/or metal salts in the water soluble form and thereafter depositing the same on the surface of the vinylic filler in water insoluble form by precipitation or by chemical reaction between said vinylic filler and said coloring component.

Such vinylic fillers and vinylic filler pigments, herein called "Vinylic Filler Materials", consist essentially of spheruloidal organic polymer material three dimensionally cross-linked to essential insolubility in any physical solvent and having primary particles in the colloidal size range of about 5 millimicrons to not more than 4.0 microns average diameter; said spheruloidal particles having on the surface thereof from 0 to an equal weight based on the spheruloids, of an insoluble coloring component, said coloring component, when present, comprising organic and/or inorganic material at least in part precipitated in insoluble form onto said surfaces from water soluble precursor material thereof in aqueous solution and typical examples of known recipes for their preparation in latex form are hereinafter set forth in the text and in Tables I and II. Vinylic filler materials made according to the heretofor known processes have generally possessed the inherent drawback that on drying, which is a necessary prerequisite to obtain a suitable pigment for most nonaqueous applications, they form extremely hard agglomerates which in most cases can only with great difficulty be broken down to even approach their original colloidal particle size, thus preventing development of their full color potential or elastomer reinforcing potential unless utilized in never previously dried form.

OBJECTS OF THE PRESENT INVENTION

The present invention aims in particular to provide improved vinylic filler products and processes which overcome various of the disadvantages above noted.

SUMMARY OF THE INVENTION

This invention, as a whole, is based on and includes applicants' hypotheses (1) that the vinylic filler particles as described in the aforementioned publications, each of which is incorporated herein by reference, on drying become bound together by ionic or hydrogen bonding to form said very hard agglomerates; (2) that by preventing the formation of such bonding between the individual vinylic pigment particles on drying, a soft friable vinylic filler or vinylic filler pigment might be obtained; (3) that this soft powdering product might readily disperse in elastomers and plastomers, water and oil based coating systems, and other environments of use; (4) that this soft powdering product might even retain fully the ability of the vinylic filler in never-dried form to reinforce elastomers; and (5) that the affirmation of hypotheses (2) through (4) might be proven by properly incorporating into the vinylic filler particles some agent which could condition the vinylic filler material so that it would not form hard aggregates on drying. The present invention has disclosed proper agents for the desired purpose and proper procedures for their incorporation into the vinylic filler material during the isolation steps of the aforementioned patents, prior to drying, and that by use thereof the hypothetical improvements (2), (3) and (4) are obtained.

The agents found to have such utility when properly employed are materials selected from the class consisting of aliphatic, cycloaliphatic and aromatic hydrocarbons and alcohols having boiling points between 90° C. and 200° C., and mixtures thereof preferably the predominantly aliphatic hydrocarbon solvents of this class such as Solvent Naphtha and Stoddard Solvent. Naphtha Solvent, or Solvent Naphtha is a mixture of low boiling hydrocarbons having a boiling range of 90°–165° C., obtained in the distillation of coal tar, petroleum or shale oil, and may contain appreciable portion of benzene or its homologues. Stoddard Solvent is a petroleum distillate with a minimum flash point of 100° F., 90% distillable at 375° F. with an end point of 410° F.

Such hydrocarbon systems are preferably used in the presence of an oil soluble surface active agent, especially when sufficient of the latter is present to form a self emulsifying system. The oil soluble surface active agents are selected from the class of materials extensively defined by Schwartz, Perry and Birch in their book "Surface Active Agents and Detergents", Vol. II, Interscience Publishers Inc., New York (1958) especially pages 244–247 and pages 597–605, herein incorporated by reference. Such useful surface active agents include the dialkyl sulfosuccinates, the mahogany sulfonates, long chain (16–18 carbon atoms) alkyl aromatic sulfonates, dialkyl naphthalene sulfonic acids, esters of higher fatty acids, higher amine salts of naphthalene, sulfonic acids, lanolin, lanolin fatty acids, naphthenic acids and their salts, glycol ethers, acyclic alcohols and keto alcohols, fatty alkylol amides and the sorbitan and polyethenoxy sorbitan nonionics.

Thus the present invention provides a process for producing a soft, readily dispersible dry vinylic filler product, which process consists essentially in treating an aqueously wet, never previously dried vinylic filler material, in an aqueous dispersion containing a dispersing agent, with a sufficient amount, in the range from 0.5 to 35% by weight, based on the vinylic filler present, of an agent selected from the class consisting of the aliphatic, cycloaliphatic and aromatic hydrocarbons and alcohols having boiling points between 90° C. and 200° C., and mixtures thereof for a sufficient time in the range of 5 minutes to 5 hours, and at a sufficient nonboiling temperature in the range of 25° C. to 100° C. to effect conditioning of said vinylic filler material so that it will not form hard aggregates on drying, and thereafter drying the so treated product.

The mechanism accounting for the soft powdering effect on the vinylic filler pigment particles is not clearly understood but it is believed that the hydrocarbon components of the soft powdering additives, which are carried onto the surfaces of the vinylic filler pigment particles by means of the surface active components present, subsequently inhibit hydrogen bridging between the said vinylic filler pigment particles by occupying the sites at which such could occur until after the elimination from the system of the aqueous phase, and thereafter are themselves substantially removable at a more elevated temperature when their presence is not desired in the soft powdered product.

Before proceeding with the detailed description and examples of the improvements of the present invention, we will here refer in more detail to the heretofore known vinylic fillers and the heretofore known processes for their manufacture.

In U.S. Pat. Nos. 3,190,850 and 3,423,358, herein incorporated by reference, the basic principles and processes for manufacture of vinylic filler materials, i.e. vinylic fillers and vinylic filler pigments are given in detail and Tables I and II herein are illustrative of typical recipes that can be used in preparing vinylic filler latices which are capable of improvement by the present invention and which will combine with dyestuffs or their precursors from aqueous solution to form the vinylic pigment latices which are capable of improvement by the present invention.

Vinylic type filler latices are prepared according to polymerization recipes of which the following represents typical limits in parts by weight:

| | |
|---|---|
| Monomer and or mixtures thereof (containing cross-linking agent) | 100 |
| Water | 100 to 350 |
| Emulsifying agents | 0 to 20 |
| Polymerization catalysts (peroxide, redox, etc.) | 0.02 to 2.0 |

Graft vinylic filler latices are prepared according to polymerization recipes of which the following represent typical limits:

| | |
|---|---|
| Latex from previous steps (see limits above) | |
| Monomer and/or mixtures thereof | up to 100 |
| Water | 0 to 350 |
| Emulsifying agent | 0 to 20 |
| Polymerization catalyst | 0 to 2.0 |

If methanol or other antifreeze solution in water is used in place of water in the recipes shown above then subzero polymerization temperatures can be used or if a pressure vessel is provided the temperature can be raised to the range of 150° C. to 250° C. or to a critical upper temperature at which emulsions are no longer stable. it is convenient, however, to use 40° to 100° C. or above and a polymerization time of 8 to 16 hours where vinyl monomers are principally concerned and 80° C. to 150° C. where allyl monomers principally are concerned.

It is of course understood that vinylic fillers are formed by either single step or multi-step polymerization. Thus, multi-polymer vinylic fillers can be formed from hydrophobic polymers, or from hydrophilic polymers (e.g., vinylic fillers from polymeric emulsifiers) by a cross-linking polymerization step.

It is understood that grafted vinylic fillers are formed by grafting onto previously formed vinylic fillers, either noncross-linked or cross-linked elastomers, plastomers, or condensation products and such grafts when themselves of noncross-linking materials are usually in amounts equal to or less than the amount of vinylic core material present.

Table 1

| Recipe (parts by weight) | I-A | I-B | I-C | I-D | I-E | I-F | I-G | I-H | I-J | I-K | I-L |
|---|---|---|---|---|---|---|---|---|---|---|---|
| Water | 300 | 300 | 300 | 300 | 300 | 300 | 300 | 600 | 600 | 600 | 600 |
| Monomers: | | | | | | | | | | | |
| Styrene | 80 | 90 | 80 | 80 | 98 | 80 | 80 | 94 | 96 | 90 | — |
| Methacrylic acid | — | — | — | 10 | — | 10 | — | — | — | — | — |
| 4-vinylpyridine | — | — | — | — | — | — | 10 | — | — | — | — |
| Acrylic acid | — | — | — | — | — | — | — | 4 | — | — | — |
| Methacrolein | 10 | — | — | — | — | — | — | — | — | — | — |
| Dimethylaminoethylmethacrylate | — | — | 10 | — | — | — | — | — | — | — | — |
| Acrylonitrile | — | — | — | — | — | — | — | — | 1.5 | — | — |
| Vinylacetate | — | — | — | — | — | — | — | — | — | — | 100 |
| Divinylbenzene (100% basis)[1] | 10 | 10 | 10 | 10 | 2 | 10 | 10 | 2 | 2 | 10 | — |
| Ethyleneglycoldimethacrylate | — | — | — | — | — | — | — | — | — | — | 5 |
| Emulsifier: | | | | | | | | | | | |
| Alkyl-aryl sodium sulfonate (Santomerse-3, Monsanto) | 10 | 10 | 10 | 10 | 6 | 10 | 10 | — | — | — | — |
| Lauryl sodiumsulfonate (Duponol ME, duPont) | — | — | — | — | — | — | — | — | — | 0.3 | 0.3 |
| Styrene-maleic acid copolymer[2] (Ratio 47 to 53) | — | — | — | — | — | — | — | — | — | 10 | 10 |
| Polyvinyl alcohol (Elvanol, 51-05, duPont) | — | — | — | — | — | — | — | — | — | — | 1 |
| Catalyst system and modifiers: | | | | | | | | | | | |
| Disopropylbenzene hydroperoxide | 0.6 | 0.6 | 0.5 | 0.5 | 0.6 | 0.6 | 0.6 | — | — | — | — |
| Tetraethylenepentamine | — | — | 0.15 | — | — | — | 0.14 | — | — | — | — |
| Potassium chloride | 0.5 | 0.5 | 0.5 | 0.5 | 0.5 | 0.5 | 0.25 | — | — | — | — |
| Potassium pyrophosphate | 0.21 | 0.21 | 0.07 | 0.1 | 0.21 | 0.07 | 0.07 | — | — | — | — |
| Ferrous sulfate | 0.19 | 0.19 | 0.05 | 0.09 | 0.15 | 0.19 | 0.05 | — | — | — | — |
| Tertiarydodecyl mercaptan | 0.075 | 0.064 | — | 0.075 | 0.075 | 0.08 | — | — | — | — | — |
| Potassium persulfate | — | — | — | — | — | — | — | — | — | 1.0 | — |
| Ammonium persulfate | — | — | — | — | — | — | — | 1.0 | 1.0 | — | 0.5 |
| Aqueous ammonia 28% | — | — | — | — | — | — | — | — | — | 6.6 | 10 |
| Sodium bisulfite | — | — | — | — | — | — | — | 0.5 | 0.5 | 0.5 | 0.3 |
| Polymerization conditions: | | | | | | | | | | | |
| Temperature, ° C | 50 | 60 | 60 | 60 | 60 | 60 | 60 | 60 | 60 | 60 | 70 |
| Time, hours | 12 | 12 | 12 | 12 | 17 | 12 | 12 | 18 | 18 | 18 | 15 |
| Total dry solids, percent | 25.7 | 26.8 | 18.2 | 26.4 | 25.8 | 26.9 | 26.9 | 13.6 | 13.7 | 14.0 | 15.6 |

Table 1-continued

| Recipe (parts by weight) | I-A | I-B | I-C | I-D | I-E | I-F | I-G | I-H | I-J | I-K | I-L |
|---|---|---|---|---|---|---|---|---|---|---|---|
| Type of vinylic filler | (3) | (4) | (5) | (6) | (4) | (6) | (7) | (6) | (8) | (6) | (6) |

[1] The cross-linking agent divinylbenzene is commercially available in 50% purity.
[2] In 1,300 grams of benzene under reflux are polymerized in 3 hrs. 70 grams of styrene, 80 grams of maleic anhydride catalyzed by 2.25 grams of benzoyl peroxide and modified by 1.5 grams of tert.-dodecylmercaptan.
[3] Reactive aldehyde
[4] Non-polar
[5] Basic
[6] Acid
[7] Pyridine
[8] Polar Table II is illustrative of representative recipes for graft vinylic fillers. In this table core vinylic filler latices from Table I are grafted with additional polymeric material.

Table II
Representative graft vinylic filler latex recipes

| Recipe (parts by weight) | II-A | II-B | II-C | II-D | II-E | II-F |
|---|---|---|---|---|---|---|
| Vinylic filler latex type | (1) | (2) | (1) | (1) | (1) | (3) |
| Latex designation (see Table I) | I-D | I-E | I-D | I-F | I-F | I-G |
| Latex quantity | 410 | 407 | 418 | 410 | 690 | 435 |
| Water | 100 | 50 | — | 400 | — | 100 |
| Monomers for grafts: | | | | | | |
| Butadiene | 12.75 | — | — | — | 20 | — |
| 4-vinylpyridine | 2.25 | — | — | — | — | — |
| Methylmethacrylate | — | 100 | — | — | — | — |
| Styrene | — | — | 20 | — | — | — |
| Methacrolein | — | — | 10 | — | — | — |
| Catalyst: | | | | | | |
| Azobis (isobutyronitrile) | 0.1 | 1.0 | 1.0 | — | 0.5 | — |
| Ammonium persulfate | — | — | — | — | 0.1 | — |
| Chemical addition reactions: | | | | | | |
| Dodecyl mercaptan | — | — | — | — | 0.85 | — |
| Propylene oxide | — | — | — | 20 | — | — |
| 28% Ammonia | — | — | — | — | — | 4.8 |
| Urea | — | — | — | — | — | 13.5 |
| Formaldehyde 36% | — | — | — | — | — | 42.7 |
| Sodium hydroxide | 0.5 | — | — | — | — | 0.1 |
| Butyl mercaptan | — | — | — | — | 8.25 | — |
| Polymerization conditions: | | | | | | |
| Polymerization temp., 0° C. | 60 | 60 | 60 | 60 | 60 | 60 |
| Polymerization time, hrs. | 17 | 17 | 17 | 48 | 64 | 17 |
| Total dry solids, percent | 22.6 | 32.4 | 33.3 | 14.9 | 28.0 | 28.0 |
| Type of graft vinylic filler | (4) | (5) | (6) | (7) | (8) | (9) |

[1] Acid
[2] Non-polar
[3] Pyridine
[4] Acid base
[5] Polar acrylate
[6] Acid aldehyde
[7] Acid ester
[8] Polar sulfur
[9] Polar condensate

DETAILED DESCRIPTION
GENERAL PROCEDURE

The improved soft powdered vinylic filler products are made following the procedures given in U.S. Pat. Nos. 3,190,850 and 3,423,358 with the additional incorporation into the manufacturing step, prior to the isolation from the aqueous phase, of the necessary materials and procedures provided for by the present invention. It has been found helpful, although not essential, to modify the equipment utilized at this point by incorporating into the vessel used for the treatment, baffles to increase the agitation and produce a turbulent flow of material to effect more efficient and intimate mixing of the component ingredients thereof. It has also been found useful to ensure intimate and effective association of the soft powdering ingredients with the vinylic filler particles and the treatment therewith take place for a sufficient period of time at a temperature sufficiently high to ensure the adequate conditioning of the vinylic filler or vinylic pigment particles. Typical procedures for practice of the invention are fully disclosed in the following examples, wherein Examples A, B, and C are non-colored vinylic filler examples and Examples 1–33 are colored vinylic filler examples. Such detailed procedures show in each case the inclusion of the soft powdering ingredients and the addition of coagulant to cause the primary or colloidal particles of the latex to agglomerate into clusters of filterable size so that the product may be filtered, washed and dried into the soft friable form provided by the present invention. It is to be understood that the term "drying" as used herein connotes both oven type or drum drying by convection or hot air currents and/or heating coils and also spray drying of the treated product either prior to filtration or subsequent thereto, that the term "primary particles" as defined and used herein has its accepted meaning in the field of colloidal chemistry, which is set forth for examples in "The Colloidal Chemistry of Silica and Silicates" by Ralph K. Iler (Cornell Unversity Press, 1955) at pages 129–130, and in "Colloidal Dispersions" by Earl K. Fischer of the National Bureau of Standards, Washington, D.C. (John Wiley & Sons, Inc., New York) at pages 3–7.

PREPARATION OF IMPROVED DRY VINYLIC FILLER PRODUCTS

I. From Vinylic Filler Lattices

Example A

To a vessel equipped with stirrer, temperature controls and baffles for inducing turbulent flow agitation was charged 500 ml. of vinylic filler latex of the aforesaid type I-B containing 26.8% solids and 1000 ml. of water. The mixture was stirred for 10 minutes at 28° C. and then 40 ml. of a 20% solution of a dioctyl ester of sodium sulfosuccinic acid dissolved in Solvesso 140 was added, followed by 50 grams of glacial acetic acid dissolved in 150 ml. of water. The coagulated slurry was heated to 80° C. and held at this temperature for 5 hours, then filtered, washed acid free and oven dried. A yield of 140 grams of soft white vinylic filler product was obtained which was found to give excellent reinforcing properties when mill incorporated into rubber compounding formulations, yielding tensiles of over 3,000 p.s.i., comparable to the tensiles obtained from specimens produced by wet masterbatching of the same rubber in the same proportions, dry basis by weight, with never dried type I-B vinylic filler latex.

Example B

The procedure of the preceding Example was followed with the exception that in place of the 50 grams of glacial acetic acid was used 50 grams of sodium hydroxide dissolved in 170 ml. of water.

The product on filtering, washing alkali free and drying was found to be extremely soft and had similar excellent reinforcing characteristics when mill or Banbury incorporated into rubber compounding formulations.

Example C

The procedure of Example A was followed with the exception that, after filtering and washing the product acid free, the essentially salt free presscake was reslurried in 700 ml. of water and the slurry so formed was then spray dried. The soft powdering product in particulate spray dried form, had similar utility to that of the oven dried example.

II. From Vinylic Pigment (Dyed Vinylic Filler) Latices

Example 1

To a vessel equipped with stirrer, temperature controls and baffles for inducing turbulent flow agitation was charged 150 ml. of acidic vinylic filler latex of the aforesaid type I-D containing 26.9% dry solids, 10 grams of Croceine Scarlet 3BA Conc. (Acid Red 73-CI No. 27290) dissolved in 200 ml. of water. The mixture was stirred for 30 minutes at 28°-30° C. and the temperature then raised to 50° C. and 5 grams of sodium tungstate dissolved in 200 ml. of water then run in during 10 minutes. 15 ml. of a 20% solution of a dioctyl ester of sodium sulfosuccinic acid in Solvesso 140 was then added and the vinylic pigment heated during 1 hour to 80° C., acidified to a pH of 5-6 with acetic acid, and held at this temperature for 4 hours. On filtering a bright red vinylic pigment was obtained which on drying became extremely soft and friable and could be readily dispersed in oil based systems, elastomers and plastomers.

Example 2

To a vessel equipped as in Example 1 was charged 200 ml. of basic vinylic filler latex of the aforesaid type I-G, 300 ml. of water and a solution of 10 grams of Alizarin Sapphirol B, (Acid Blue 45, CI No. 63010) run in at 25°-30° C. The temperature was raised to 45°-50° C. during 30 minutes and then 10 ml. of hydroxy acetic acid added drop-wise, followed by a solution of 10 grams of barium chloride dissolved in 100 ml. of water. The reaction was stirred for 20 minutes at 45°-50° C. and then 15 ml. of a 20% solution of diamyl sodium sulfosuccinate in Solvesso 140 added, and the reaction heated to 80°-85° C. and held at this temperature for 4-5 hours. The water soluble salts were removed by filtration and washing, and the product was then oven dried. An extremely soft bright blue vinylic pigment resulted, which could be packaged without comminution, and was suitable for incorporation directly into oil based and thermoplastic systems.

Example 3

To a vessel equipped as in the preceding Examples was charged 200 ml. of acid vinylic filler latex of the aforesaid type I-D, 500 ml. of water, and a solution of 30 grams of Yellow T Extra (Acid Yellow 23, CI No. 19140) dissolved in 300 ml. of warm water was run in with agitation. The reaction was then stirred and heated to 70°-75° C. and held 1 hour at that temperature, at which point 30 ml. of glacial acetic acid diluted with 300 ml. of water were run in to coagulate and precipitate the bright yellow vinylic pigment. 25 ml. of a 10% solution of sorbitan monolaurate in Solvent Naphtha were added and the temperature held at 75°-80° C. for 5 hours. The vinylic pigment product was isolated as in the preceding Example, forming an extremely soft textured pigment immediately suitable for packaging and for use in oil based systems.

Example 4

The procedure of Example 3 was followed with the exception that during the initial heating step 10 grams of lead nitrate dissolved in 100 ml. of water were added to further insolubilize the dyestuff. The dried product had similar advantages.

Example 5

To a vessel equipped as in the preceding experiments was charged 100 ml. of acidic type filler latex of the aforesaid type I-D containing 26.4% solids, 300 ml. of water and 10 grams of Chrysophenine G (Direct Yellow 12, CI No. 24895) dissolved in 200 ml. of warm water. The mixture was stirred for 10 minutes at 28°-30° C. and then 20 grams of barium chloride dissolved in 100 ml. of water added to insolubilize the dye. The reaction was then heated to 75°-80° C. during 2 hours and at this point 20 ml. of a 10% solution of octylphenoxymethoxyethanol in Solvesso 140 was added and the reaction held at 80° C. for a further 4 hours. The vinylic pigment was then filtered, washed and dried in an oven at 70° C. and gave a bright yellow pigment which was extremely soft and ready for packaging and incorporation in oil based systems and plastomers, and as a reinforcing and coloring filler for elastomers.

Example 6

To a vessel equipped as in the preceding Examples was charged 100 ml. of a basic vinylic filler latex of the aforesaid type I-G containing 26.9% solids, 300 ml. of water and 10 grams of Fast Blue FFB (Direct Blue 71, CI No. 34140) dissolved in 150 ml. of water. The mixture was stirred for 10 minutes followed by the addition of 10 grams of zinc chloride dissolved in 200 ml. of water. Stirring was continued and the temperature raised to 80° C. during 2 hours at which time 15 ml. of 20% solution of bis(tridecyl) ester of sodium sulfosuccinic acid in Solvent Naphtha was added and the reaction held for 3 hours longer at 80°-85° C.

The product was filtered and washed to give a bright blue vinylic pigment presscake which on drying was extremely soft and friable and ready for packaging and for use in thermoplastic and oil based systems.

Example 7

To a vessel equipped as in the preceding Examples was charged 150 ml. of vinylic filler latex of the aforesaid type II-D containing 14.9% solids, 10 grams of Diazine Scarlet A Conc. 200% dissolved in 200 ml. of water at 90° C., 250 grams of ice and agitated for 5 minutes, then was added 6 ml. of 37% hydrochloric acid and 0.7 grams of sodium nitrate dissolved in 10 ml. of water. At the end of 15 minutes the diazotization was complete and during this time ice was added to hold the temperature at 15° C. Then 2 grams of beta naphthol and 1 gram of potassium hydroxide was dissolved in 30 ml. of water at 90° C. and this solution was added to the reaction vessel while agitating, and for 15 minutes the temperature was maintained at 15° C. with ice, then over the next half allowed to rise to 22° C. After another 30 minutes of agitation, coupling was complete. A drop of the mix on filter paper showed no bleeding and a filtered sample developed no color in the filtrate. 20 ml. of a 20% solution of bis(tridecyl) ester of sodium sulfosuccinate dissolved in Solvent Naphtha was then added together with 200 ml. of water and the temperature raised during 1 hour to 75°-80° C. and held at this temperature for 5 hours. The bright red vinylic pigment was then filtered, washed and dried in the oven at 75°-80° C. The product was extremely soft and required no crushing or grinding to ready it for packaging or for use in oil based systems as a colorant.

Example 8

To a vessel equipped as in the preceding Examples was charged 200 ml. of basic vinylic filler latex of the aforesaid type II-G with 26.9% solids content, 10 grams of Diazine Scarlet A Conc. 200% dissolved in 200 ml. of water at 90° C. and 5 ml. of triethanolamine. After agitating for 15 minutes 10 grams of aluminum chloride dissolved in 50 ml. of water was added and the red vinylic pigment was formed. 40 ml. of a 10% solution of sorbitan monolaurate in Solvesso 140 was added and the temperature raised to 80°-85° C. and held within this range for 4 hours. The slurry was filtered, washed and dried to give a bright red vinylic pigment, which like the preceding Example was extremely soft and friable and required no crushing or grinding to ready it for packaging or for use as a pigment.

The aforesaid publications of Burke show that if azo colors, formed from soluble materials to yield the insoluble azo colors, are formed in the presence of vinylic filler particles, then even though the vinylic filler is completely insoluble, the azo color will form on the surface of the vinylic filler, yielding vinylic pigment particles of colloidal size.

The field of azo colors is very broad, thus the examples here, as elsewhere in this description, are meant to be illustrative of the soft powdering of said azo vinylic pigments and are not to be construed as limiting.

Example 9

To a vessel equipped as in the preceding Examples was charged 7 grams of p-nitroaniline, 200 ml. of cold water and 20 ml. of 37% HCl. As soon as a solution formed, 100 ml. of vinylic filler latex of the aforesaid type II-D containing 26.4% solids were added. To this mix were added 300 grams of ice and the temperature dropped to 0° C. with ice still present. Then 6 ml. of glacial acetic acid followed by 3.5 grams of sodium nitrite dissolved in 20 ml. of water were added. The diazotization took place rapidly and was completed in about 15 minutes. A solution wwas prepared of 7 grams of beta-naphthol, 5 grams of caustic soda, and 100 ml. of water, and this solution was added to the water dispersion. Ice was added from time to time holding the coupling temperature at about 5° C. for 30 minutes; then the temperature was allowed to rise to 45° C. over the next 30 minutes. From time to time a sample was taken and filtered and the filtrate observed to determine whether additional coupling was taking place. After another half-hour at a temperature of from 45°-50° C. coupling was complete. 30 ml. of a 10% solution of a dioctyl ester of sodium sulfosuccinic acid in Solvesso 140 were added and the temperature raised to 75°-80° C. during 1 hour and held at this range for a further 3-4 hours. The resulting red vinylic pigment was then filtered, washed and dried in an oven at 60°-70° C., producing a soft, friable dry pigment ready for packaging and for incorporation into oil based color systems.

Example 10

To a vessel equipped as in the preceding Examples were charged 150 ml. of vinylic filler latex of the aforesaid type I-B containing 26.8% solids, 200 ml. of water, a solution consisting of 7.4 grams of beta naphthol and 2.2 grams of caustic soda and 50 ml. of water, a solution of 8.6 grams of Tobias Acid and 2.2 grams of caustic soda and 50 ml. of water, followed by 300 grams of ice to drop the temperature to 0° C. With high speed agitation 12.5 ml. of 37% hydrochloric acid and 2.5 ml. of glacial acetic acid were added and the temperature rose 5° C. Then 3.5 grams of sodium nitrate ws added; the color changed to yellow and the diazotization was allowed to proceed for 5 minutes, then 30 ml. of 10% sodium hydroxide were added and the color turned orange. Over a 15 minute period thte temperature was allowed to rise to 40° C. and the color was still orange. Then a solution of 10 grams of barium chloride dissolved in 100 ml. of water was added and the color changed to deep orange. Rapid agitation was continued for 30 minutes during which time the temperature rose to 60° C. and the color deepened to a typical Lithol Red R shade. The resulting vinylic pigment was carefully filtered, reslurried in water and again filtered. Three filtrations and reslurryings removed the soluble salts and the product was finally reslurried in 700 ml. of water; 20 ml. of a solution of sorbitan monolaurate dissolved in Solvent Naphtha was added, and the mixture was heated to 80° C. The temperature was held at 80° C. for 4 hours and then spray dried to yield a red vinylic pigment that was extremely soft and ready for packaging and for use in thermoplastic and oil based systems.

Example 11

To a vessel equipped as in the preceding Examples was charged 200 ml. of vinylic filler latex containing surface carboxylic groups above designated as type I-D latex having 26.4% solids content. Following was added 10 grams of Alizarien Red S (Mordant Red II, CI No. 5800) dissolved in 200 ml. of water at 50° C. containing 3 grams of caustic soda. Then were added 4 grams of aluminum acetate, 4.7 grams of calcium acetate 5.7 grams of stannous chloride, and 10 grams of sodium sulfite, each dissolved in 50 ml. of water. After stirring for 5 minutes, 3 ml. of 90% formic acid were added, followed by 3 grams of oxalic acid added dry to the mix while agitating, and then heated, by means of a steam tube to introduce live steam, to 95° C. for 5 minutes. Thereafter the mass was diluted with an equal volume of water, filtered and washed carefully to remove all salts. The product was reslurried in 500 ml. of water and 20 ml. of a 20% solution of octylphenoxydimethoxyethanol in Solvesso 140, added. With agitation the temperature was raised during 7 hours to 80°-85° C. and held there for 5 hours. The red Alizarine vinylic pigment cake was then filtered, washed and dried. An extremely soft powdery product was obtained suitable for packaging and use in oil based systems.

Example 12

To a reaction vessel equipped as in the preceding Examples were charged 400 ml. of water, 10 grams of caustic soda, 10 grams of sodium hydrosulfite, and 10 grams of the Indanthrene Blue designated as Carbanthrene Ptg. Blue GCD Dbl. Pdr. (Vat blue 14, CI No. 69810). During 10 minutes the dyes reduced to the leuco form while stirring very slowly and by means of a steam tube, slowly raising the temperature to 60° C. Then were added 100 ml. of a neutral vinylic filler type I-B aforesaid of 26.8% solids content. The leuco vat dye in the presence of the vinylic filler latex was now oxidized by adding to the mix 10 grams of potassium persulfate. The oxidation was carried out with vigorous agitation and in another 10 minutes the product was completely oxidized, for the filtrate of a sample was colorless. The vinylic pigment suspension was diluted with an equal volume of water and 30 ml. of a 20% solution of diamyl sodium sulfosuccinate in Solvent Naphtha were added. The temperature was then raised to 75°-80° C. and held there for 4-5 hours. The bright blue vinylic pigment was then filtered, and the filter cake carefully washed until all water soluble salts were removed. A portion of the treated filter cake was dried in an oven at 70° C. A further portion of the treated filter cake was reslurried in sufficient water to give a 20% solids content and spray dried. When isolated in the dry form either by oven or spray drying the pigment was extremely soft and friable and could be redispersed in the vehicle of intended use with the minimum of mechanical effort, giving a fully developed coloration of same, free of undesirable specks or agglomerations.

Example 13

In place of the neutral vinylic filler an acid vinylic filler is used and the dye prepared according to the preceding example. Alternatively, in this case, the vinylic filler can be surfaced with a heavy metal salt which will in some cases effect the shade.

For example, to 100 grams of vinylic filler containing free carboxylic groups above designated as II-D with 26.4% solids, was added 5 grams of caustic soda and 400 ml. of water in the reaction vessel and then 7 grams of aluminum chloride and 7 grams of calcium chloride each dissolved in 50 ml. of water were added. The latex thickened, but experience had shown that this would not prevent the leuco vat dye from being oxidized on the surface of these vinylic filler particles.

The leuco dye of the Indanthrene Blue was prepared in the same manner as the previous Example, and the metal salted vinylic filler latex was added thereto and the mix oxidized to coat the insoluble vinylic pigment with insoluble vat dyestuff. The soft powdering procedure of Example 12 was then carried out and the product isolated and oven dried as in the previous Example, and had similar utility.

Example 14

The first Example of a vinylic pigment from Carbanthrene Ptg. Blue GCD Dble. Pdr. was prepared according to Example 12 except that a basic vinylic filler latex designated at type I-G containing 26.9% solids was used in place of type I-B. This Example yielded comparable results.

Example 15

This Example was the same as the preceding Example, except that a graft vinylic filler type II-A with 22.6% solids was used in place of the type I-G vinylic filler latex. The results were similar.

Example 16

To the reaction vessel was charged 400 ml. of water, 10 grams of caustic soda, 10 grams of sodium hydrosulfite, 10 grams of Carbanthrene Red BN Dble. flakes, and then with very slow agitation the mix was heated by the steam tube and at 45° C. a clear blue solution was formed. To this leuco dye solution was added 100 ml. of the above vinylic filler latex type I-G of 26.9% solids, and for 5 minutes this was rigidly agitated. Then 10 grams of potassium persulfate were added and the color changed from blue to red. After 10 minutes of agitation a sample was tested for bleeding and the filtrate was clear, indicating all the leuco dye was converted to the insoluble vat form on the surface of the vinylic filler particles. The mix was diluted with an equal part of water and 30 ml. of the soft powdering agent added as in Example 12. The pigment dispersion was then heated to 80° C. and held at this temperature for 4 hours. The red vinylic pigment was then filtered, washed free of soluble salts and oven dried, which yielded a soft powdered pigment ready for packaging and use.

Example 17

This Example was prepared in the same manner as the preceding Example, except acidic vinylic filler latex type I-D of 26.4% solids was used in place of I-G vinylic filler latex. The results were similar.

The Examples given hereafter illustrate that never previously dried vinylic pigments from basic dyestuffs can also be treated to render the ensuing pigment particle soft and readily redispersible after drying.

Example 18

To a reaction vessel equipped as in the preceding Examples was charged 200 ml. of vinylic filler of the aforeseaid type latex I-D containing 26.4% solids, 15 grams of propylene glycol 1024, 200 ml. of water, a solution of 5 grams of Victoria Green WB Crystal (Basic Green 4, CI No. 4200) dissolved in 200 ml. of water at 80°–90°0 C. After stirring for 15 minutes no color bleeding was observed on spot testing on filter paper. 30 ml. of a 10% solution of polyethylene sorbitan monolaurate in Solvesso 140 was added and the suspension of vinylic pigment heated for 4 hours at 85°–90° C. On filtering, washing, and drying a soft, bright green vinylic pigment was obtained which was extremely soft and required no further mechanical grinding to be ready for packaging and incorporation into pigment formulations.

Example 19

This is similar to the previous Example except instead of the basic dye Victoria Green WB Crystals, 5 grams of Fuchsine Y Fine Crystals was used (Basic Violet 14, CI. 42510). The results were similar.

Example 20

To a reaction vessel equipped as in the foregoing examples was charged 200 ml. of graft vinylic filler latex of the aforesaid type II-A containing 22.6% solids and 500 ml. of water; then 10 grams of Auramine O Conc. 130% (Basic Yellow 2, CI No. 41000) dissolved in 200 ml. of water at 95°0 C. was added and stirred well. A solution of 8 grams of tannic acid to 40 ml. of water was prepared and added followed by 12 grams of antimony potassium tartrate dissolved in 50 ml. of water. After mixing, the never previously dried vinylic pigment was treated with a soft powdering agent as in Example 19. A bright yellow vinylic pigment was obtained on separation of the coagulum from the serum by filtration and washing. When dried this soft powdered pigment product was suitable for packaging and use as a pigment.

Example 21

To the reaction vessel was charged 200 ml. of vinyl filler latex type I-G containing 26.9% solids and 400 ml. of water. With rapid stirring was further added 10 grams of Methyl Violet 2B Conc. 125% (Basic Violet 1, CI No 42535), dissolved in 100 ml. of water at 95° C.; after agitating for 10 minutes there was added a solution of 5 grams of ammonium molybdate dissolved in 50 ml. of water and 2 ml. of conc. hydrochloric acid dissolved in 20 ml. of water. After stirring for 5 minutes the reaction was heated to 90° C. during 1 hour and 20 ml. of a 20% solution of a dioctyl ester of sodium sulfosuccinic acid in Solvesso 140 was added. The mixture was held at 85°–90° C. for 4 hours, filtered, washed and dried to yield a dry extremely soft textured pigment suitable for use, e.g. for reinforcing and coloring elastomers and for coloration of nonrigid or rigid thermoplastic material.

Example 22

This Example was prepared in a quantity and a manner similar to the preceding Example except that in place of the Methyl Violet there was used 10 grams of Crystal Violet Super Fine (Basic Violet 3, CI No. 42555) and in addition to the ammonium molybdate was added 2 grams of disodium phosphate dissolved in 20 ml. of water. The treated vinylic pigment was carefully filtered and washed and during this filtration operation no color was present in the filtrate indicating a stable pigment had formed. The presscake was dried to yield a product useful as indicated in the preceding Example.

Example 23

This Example was prepared in quantity and in a manner similar to the previous Example except that in place of the Crystal Violet there was used 10 grams of Calcozine Blue R Ex. Conc. (Victoria Blue B) (Basic Blue 7, CI No. 42595) and as metallic mordant for this basic dyestuff in place of the ammonium molybdate and disodium phosphate, was used 5 grams of sodium tungstate dissolved in 50 ml. of water. The blue vinylic pigment formed with complete exhaustion of color from the water, and was treated isolated and dried as in the preceding Example to yield a soft deep blue pigment with the same uses.

Example 24

This example was prepared in a manner and quantity similar to the previous Example except in place of the basic dyestuff Victoria Blue, was used 10 grams of Calcozine Red 6G Ex. (Rhodamine 6G) (Basic Red 1, CI No. 45160) and as the mordant in addition to the sodium tungstate there was added 2 grams of disodium phosphate dissolved in 20 ml. of water. The red vinylic pigment formed with complete exhaustion of the basic color from the water medium, and the treated vinylic pigment, as in the preceding Examples, was extremely soft on drying, and had similar utility in thermoplastic systems.

Example 25

To a reaction vessel equipped as in the preceding Examples was charged 200 ml. of graft vinylic filler latex designated as type II-A, 500 ml. of water, 10 grams of Rhodamine B Conc. 500% (Basic Violet 10, CI No. 45170) dissolved in 200 ml. of water at 90° C., and the mix was well agitated. The metallic mordant solution was prepared by dissolving 1.7 grams of sodium molybdate, 3.0 grams of sodium tungstate and 1.1 grams of disodium phosphate in 50 ml. of warm water. Following the addition of the mordant solution there was added 5 ml. of concentrated hydrochloric acid (37% HCl) diluted with 30 ml. of water. During 15 minutes the mix was heated to 90° C., during which period it was vigorously agitated. The violet red vinylic pigment formed with complete exhaustion of the basic color from the water. 20 ml. of a 10% solution of polyethylene sorbitan monolaurate in Solvesso 140 was then added and the reaction held at 85°-90° C. for 5 hours. The product was then filtered, washed and oven dried, yielding an extremely soft pigment ready for packaging and use, e.g. for reinforcing and coloring elastomers and for coloration in nonrigid and rigid thermoplastic systems.

Example 26

To a reaction vessel equipped as in the previous Examples was charged 400 ml. of water 10 grams of sodium hydroxide and 10 grams of Sulfur Bordeaux 9R (Sulfur Red 6, CI No. 53720). After heating to 60° C. the dye was in solution and at this point 100 ml. of acidic vinylic filler latex type I-D, containing 26.4% solids was run in. After 5 minutes 110 ml. of 10% sulfuric acid was added and the color changed to reddish purple. The slurry was then heated to 85°-90° C. and 20 ml. of a 20% solution of a dioctyl ester of sodium sulfosuccinic acid in Solvesso 140 was added and heating continued at 85°-90° C. for 4 hours. The so treated vinylic pigment was filtered, washed and oven dried and yielded a soft friable pigment product ready to use in pigment applications.

Example 27

In a manner similar to the preceding Example, a dark blue, soft powdering vinylic pigment was prepared using 10 grams of Sulfur Direct Blue N Conc. (Sulfur Blue 15, CI No. 53540), which had similar advantages.

We have discovered that vinylic pigments having pigmentation of inorganic origin, can be conditioned according to the present invention with advantage.

The graft-formed vinylic filler latex used in the following Examples was prepared according to the following recipe:

A polymeric emulsifier was prepared by polymerizing 70 grams of styrene, 80 grams of maleic anhydride in 1300 grams of benzene using 2.25 grams of benzoyl peroxide as catalyst and 1.5 grams of tertiary dodecyl mercaptan as modifier. The polymerization was carried out over a 3 hour period at the reflux temperature of benzene. The co-polymer as a white powder was filtered from the benzene and dried. With this polymeric emulsifier graft-formed vinylic fillers were prepared as exemplified by the following recipe According to this recipe there was charged to a pressure bottle 10 grams maleic anhydride-styrene copolymer prepared as heretofore described dissolved in 620 ml. of water containing 14.5 ml. of 28% aqueous ammonia and 0.5 grams of lauryl sodium sulfonate (Duponol ME). Then there were charged 85 grams of styrene, 15 grams of ethyleneglycoldimethacrylate and as catalyst 1 gram of ammonium persulfate and 0.5 gram of sodium hydrogen sulfite. The polymerization was carried out at 60° C. for 12 hours and the conversion of the monomers to polymer was complete. This graft-formed vinylic filler latex was used in the following Examples 28 to 30.

While only a single type of vinylic filler was used in the following Examples as the basis for forming the vinylic pigments with inorganic pigmentation, it is understood that any of the vinylic and graft vinylic fillers can be used. It is cautioned that in forming a pigment like the vinylic cadmium orange pigment it is important that the vinylic fillers be prepared from recipes free of iron or any other heavy metal salts capable of forming dark sulfides which would contaminate the orange color of the cadmium sulfide vinylic pigment.

Example 28

In this Example a vinylic filler pigmented with lead chromate is treated in accordance with this invention. To a reaction vessel equipped as in the preceding Examples was charged 100 ml. of the graft formed vinylic filler latex prepared as heretofore described and such latex had been heated to 95° C. First, a solution was prepared by adding 30.4 grams of lead acetate to 160 ml. of boiling water and this was added to the latex followed by a solution consisting of 12 grams of potassium bichromate dissolved in 160 ml. of boiling water. During the addition of the lead acetate solution to the vinylic filler latex thickened and the agitation was continued for 2 minutes and then potassium bichromate solution was added and agitation continued for 15 minutes. The golden yellow vinylic pigment was filtered and the filter cake was redispersed in 500 ml. of water and 20 ml. of a 20% solution of diamyl sodium sulfosuccinate in Solvesso 140 was added. The temperature was raised to 80°–85° C. with vigorous agitation and held at this range for 4 hours. On filtering, washing and oven drying of the treated vinylic filler pigment, a soft powdered vinylic chrome yellow pigment was obtained which was suitable for pigment use in oil based and thermoplastic systems.

Example 29

In this Example a vinylic filler pigmented with cadmium sulfide is subjected to the treatment of this invention and dried.

To a reaction vessel equipped as in the preceding Examples was charged 100 ml. of the vinylic filler latex prepared by the foregoing recipe and 100 ml. of water. With vigorous agitation was added 17 grams of cadmium nitrate dissolved in 50 ml. of water followed by 5 ml. of glacial acetic acid. Then 12 grams of sodium sulfide dissolved in 50 ml. of water was added to form the bright orange vinylic pigment. The resulting vinylic pigment was filtered and the filter cake redispersed in 500 ml. of water containing 20 ml. of a 20% solution of diamyl sodium sulfosuccinate in Solvent Naphtha. With vigorous agitation the temperature was raised to 80° C. and held there for 4 hours. On filtering, washing and drying a bright orange vinylic cadmium pigment was obtained which was extremely soft and ready for use as in the preceding Example.

Example 30

In this Example a vinylic filler pigmented with a Prussian blue type compound, is subjected to the treatment of this invention and dried.

To a reaction vessel equipped as in the preceding Examples was charged 100 ml. of the vinylic filler latex prepared as heretofore described and this latex was agitated. Then a solution of 13 grams of ferrous sulfate dissolved in 100 ml. of water was added followed by a solution of 10 grams of potassium ferrocyanide dissolved in 100 ml. of water. As agitation continued the greyish color mix began to turn green and then 7.5 ml. of concentrated nitric acid dissolved in 20 ml. of water was added and the color began to change to blue. After 30 minutes of agitation the deep Prussian blue vinylic pigment had formed which was diluted with water and filtered. The filter cake was reslurried in 500 ml. of water to which 2 ml. of concentrated nitric acid was added and filtered and again the filter cake was dispersed in 500 ml. of water and 20 ml. of a 20% solution of dioctyl ester of sodium sulfosuccinic acid in Solvesso 140 added. The reaction was heated with good agitation to 75°–80° C. and held at this temperature for 4–5 hours. On filtering, washing and drying a bright blue soft vinylic pigment was obtained ready for use as a color pigment.

Example 31

To a vessel equipped as in Example 1 was charged with stirring 500 ml. of acidic vinylic filler latex type I-D containing 26.9% dry solids and 1000 ml. of water. Sufficient crushed ice was added to lower the temperature to 5° C. – 10° C. and 100 ml. of titanium tetrachloride slowly added drop-wise during a period of 30 minutes, maintaining the temperature of the reaction between 5° and 7° C. with additional crushed ice as required. When the addition of the titanium tetrachloride was completed the finely divided strongly acidic precipitate of titanium dioxide on vinylic filler was stirred for 1 hour concurrently heating the slurry to 40° C. The product was then filtered and the cake immediately reslurried in 2000 ml. of 28° C. water. 40 ml. of a 20% solution of diamyl sodium sulfosuccinate dissolved in Solvent Naphtha were run in and the slurry heated during 1 hour to 80° C. and held at that temperature for 5 hours. The product was then filtered, washed acid free and oven dried to yield 220 grams of a very soft intensely white vinylic filler pigment ready for packaging for use in oil based and thermoplastic systems.

Example 32

To a vessel equipped as in Example 1 was charged with stirring 500 ml. of vinylic filler latex type I-B containing 26.8% dry solids and 700 ml. of water. 100 grams of 28% "N" sodium silicate diluted with 200 ml. of water was run in followed by sufficient 10% aqueous sulfuric acid to adjust the pH to 5.0, added slowly during a 2 hour period. The precipitated silicon dioxide/vinylic filler composite was stirred for 30 minutes and then 40 ml. of a 20% solution of a dioctyl ester of sodium sulfosuccinic acid dissolved in Solvent Naphtha added. The temperature was raised to 80° C. during 1 hour and the slurry held at this temperature for a further 5 hours. The product was separated from the serum by filtration, and the filter cake washed acid free and oven dried to yield 160 grams of an extremely soft vinylic filler composition with the silicon dioxide precipitated thereon and adhered to the surface of the particles thereof. This soft powdered vinylic filler pigment was ready for use, without further treatment, in oil based and thermoplastic systems.

Example 33

The procedure of Example 31 was followed with the exception that, after filtering and washing the product acid free, the essentially salt free presscake was reslurried in 1100 ml. of water and the slurry so formed was then spray dried to yield the product in particulate spray dried soft powdered form, with similar utility as in the oven dried example.

While there have been described herein what are at present considered preferred embodiments of the invention, it will be obvious to those skilled in the art that modifications and changes may be made therein without departing from the essence of the invention. It is, therefore, to be understood that the exemplary embodiments are illustrative and not restrictive of the invention, the scope of which is defined in the appended claims, and that all modifications that come within the meaning and range of equivalents of the claims are intended to be included therein.

We claim:

1. A process for producing a soft, readily dispersible dry vinylic filler product, which process consists essentially in (a) providing an aqueous dispersion containing a dispersing agent and an aqueously wet, never previously dried vinylic filler material, said vinylic filler material consisting essentially of spheruloidal organic polymer material that is three dimensionally cross-linked to essential insolubility in any physical solvent and that has primary particles in the colloidal size range of about 5 millimicrons to not more than 4.0 microns average diameter, said spheruloidal particles having on the surfaces thereof from 0 to an equal weight based on the spheruloids, of an insoluble coloring component, said coloring component, when present, comprising organic and/or inorganic material at least in part precipitated in insoluble form onto said surfaces from water soluble precursor material thereof in aqueous solution, (b) treating the dispersion provided in step (a) with a sufficient amount, in the range of from 0.5 to 35% by weight, based on the vinylic filler material present, of an agent selected from the class consisting of the aliphatic, cycloaliphatic and aromatic hydrocarbons and alcohols having boiling points between 90° C. and 200° C., and mixtures thereof, for a sufficient time in the range of 5 minutes to 5 hours, and at a sufficient nonboiling temperature in the range of 25° C. to 100° C. to effect conditioning of said vinylic filler material so that it will not form hard aggregates on drying, and (c) thereafter drying the so treated material thereby forming the soft, readily dispersible vinylic filler product.

2. A process as in claim 1, wherein in step (b) the said agent has combined therewith sufficient oil soluble dispersing agent to form a self emulsifying system in the aqueous dispersion.

3. A process as in claim 1 which further comprises filtering and washing the treated vinylic filler material essentially free of water soluble salts and diluents prior to drying, thereby to provide a product essentially free of water soluble materials.

4. A process as in claim 1, in which the drying of the product is effected at temperatures which are sufficient not only to remove the water from the product but also to essentially remove said agent from the product.

5. A process as in claim 1, in which the drying of the treated product is effected by spray drying.

6. A soft, readily dispersible dry vinylic filler product, which product essentially comprises (a) vinylic filler material consisting of spheruloidal organic polymer material three dimensionally cross-linked to essential insolubility in any physical solvent and having primary particles in the colloidal size range of about 5 millimicrons to not more than 4.0 microns average diameter, said spheruloidal particles having on the surfaces thereof from 0 to an equal weight based on the spheruloids, of an insoluble coloring component, said coloring component, when present, comprising organic and/or inorganic material at least in part precipitated in insoluble form onto said surfaces from water soluble precursor material thereof in aqueous solution, (b) said vinylic filler material having been treated in aqueous medium without previously having been dried with from 0.5 to 35% by weight, based on the vinylic filler material present, of an agent selected from the class of aliphatic, cycloaliphatic and aromatic hydrocarbons and alcohols having boiling points between 90° C. and 200° C., and mixtures thereof and having thereafter been subjected to drying.

7. A product as defined in claim 6, which is essentially free of water soluble salts and diluents.

8. A product as defined in claim 6, in spray dried form.

* * * * *